April 29, 1958   J. BELL   2,832,305

STABILIZATION OF SHIPS

Filed Sept. 14, 1953   2 Sheets-Sheet 1

Inventor
John Bell
By Glascock Downing Seebold
Attys.

April 29, 1958   J. BELL   2,832,305
STABILIZATION OF SHIPS
Filed Sept. 14, 1953   2 Sheets-Sheet 2

(i)

(ii)

(iii)

(iv)

(v)

(vi)

(vii)

INVENTOR
JOHN BELL
BY
ATTORNEYS

United States Patent Office 2,832,305
Patented Apr. 29, 1958

2,832,305

STABILIZATION OF SHIPS

John Bell, Beckenham, England, assignor to Muirhead & Co. Limited, Beckenham, England Application September 14, 1953, Serial No. 379,897

Claims priority, application Great Britain September 15, 1952

5 Claims. (Cl. 114—126)

This invention relates to the stabilization of ships against undesired movements due to natural forces, such as roll or pitch, and relates particularly to the functions used in the control of the stabilizing means.

Stabilization may be carried out in various ways which are well known in the art, for example, by the use of "activated" fins, i. e., fins which project from the sides of the ship and are tilted by power means within the ship in such a manner as to apply forces to the ship which oppose the undesired movements. The position and movement of the fins or other stabilizing means are controlled by signals derived from sensing means, for example, gyroscopes, which are responsive to chosen functions of the ship's movement, such as roll or pitch angle, roll velocity, roll acceleration and rate of change of roll acceleration which, according to the known art, may be combined in any desired manner to produce the final control signal which is applied to control the power means to move the fins. Such a control arrangement is shown in my co-pending U. S. patent application Serial No. 374,666, filed August 17, 1953.

In the case of an unstabilized vessel the forces acting upon it consist of the external force of the sea, which cause it to roll or pitch and those forces which are characteristic to the vessel's stability and which cause it always to return to its upright position. In a stabilized ship or vessel, however, an additional force is acting upon it, namely, the force due to the stabilizing means.

It will be readily understood by those familiar with the laws of mechanics and dynamics that when sea forces operate to cause an undesired movement they impose an acceleration upon the ship. The sensing means measure the chosen functions of the resulting movement and operate the stabilizer controls to move the fins to impose an acceleration upon the ship which opposes the acceleration due to the sea forces. The acceleration imposed by the fins is thus in the negative sense, i. e. in the opposite direction.

Perfect stabilization would be secured if it could be arranged that, at all times, the stabilizing means impose upon the ship a force which is equal and opposite to the sea forces which cause the undesired movements. Precise measurement of the sea forces is not possible and in practice, stabilization is controlled according to the residual movement which depends upon the difference between the sea forces and the opposing force applied by the stabilizing means. That is to say, the movements measured by the sensing means are the resultant movements of the vessel. Thus, if a vessel is subjected to an acceleration of, say, 1° per second per second and the stabilizing means produce a stabilizing force or opposing acceleration of 1° per second per second, then the resulting control signal will be the same as though no acceleration due to natural forces were present. This implies that a stabilizing force is called into being and operates to stabilize the vessel and is then immediately cancelled or diminished because of its own modifying effect upon the functions of motion of the vessel.

According to the present invention, a compensating function is introduced into a control signal for the stabilizing fin means which modifies the control signal by a quantity corresponding to all or part of the functions of acceleration and/or rate of change of acceleration which are imposed on the ship or vessel by the stabilizing fin means. The final control achieved is thus related more nearly to the natural forces operating on the vessel.

In the case of a vessel stabilized by fins, the angular deflection of the fins from their neutral positions represents the (negative) acceleration imposed by the stabilizing means and the velocity of movement of the fins represents the rate of change of (negative) acceleration imposed by the stabilizing means. It will be understood that since the control signal from the sensing means corresponds to the positive acceleration imposed by the sea the subtraction of a signal corresponding to the negative acceleration imposed by the fins is equivalent to adding a signal corresponding to a positive acceleration; consequently the effect is to increase the control signal so that it is more nearly equivalent to the sea forces which are acting.

The invention further consists of a control arrangement for use in connection with means for stabilizing ships against undesired movements due to natural forces, comprising means for deriving a compensating signal dependent on the position and/or velocity of the stabilizing fin means and means for introducing this into the control signal for the stabilizing fin means to subtract from or modify the control signal quantity corresponding to all or part of the acceleration and/or rate of change of acceleration which are imposed on the ship by the stabilizing fin means.

A time lag may be introduced in the application of the compensating signal, one purpose of which is to achieve greater stability in the control of the stabilizing fin means.

The amount of the compensating signal in relation to the control signal may be set to any desired level.

The invention will be further described with reference to the accompanying drawings in which.

Figure 1:
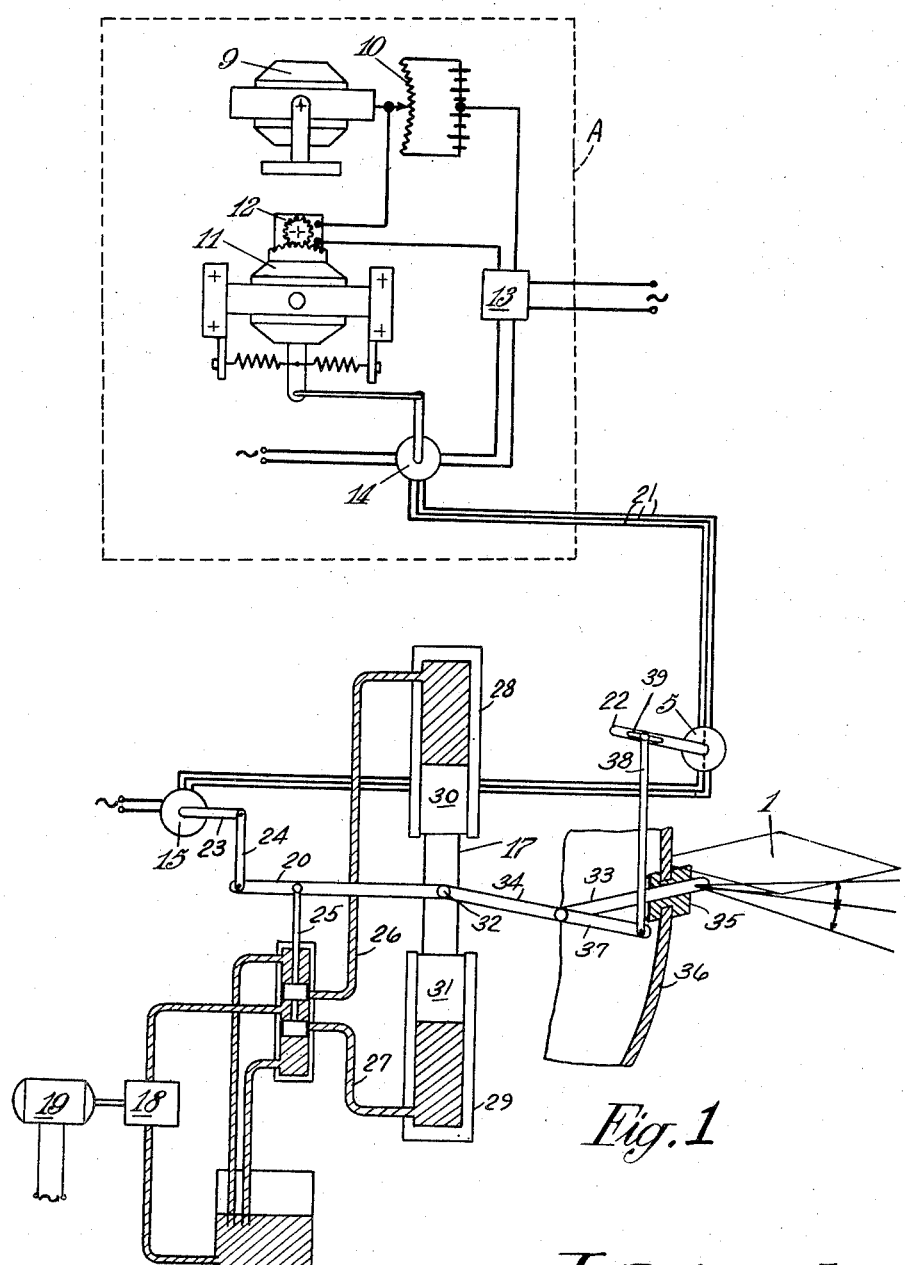
Figure 1 shows in diagrammatic form a complete stabilizing system embodying one form of the invention.

Figure 1 shows in diagrammatic form, a complete stabilizing system embodying the invention. The apparatus enclosed within the dotted box A consists of sensing means and signal producing means and may, for example, consist of the arrangement described in my co-pending U. S. patent application Serial No. 374,666.

A vertical-keeping or pendulous free gryroscope 9 is arranged with its spin axis vertical. A conventional velocity-sensitive or rate gyroscope 11 is arranged with its spin axis horizontal and athwartships and has one degree of freedom about a vertical axis. It is provided with the usual two springs urging it towards its normal position, in which its wheel rotates in a plane lying parallel to the fore-and-aft axis of the ship. It is well known in the art that if the spin axis of such a gyroscope is forced out of its normal position, for example, due to the roll of the ship, then the gyroscope will precess or rotate about the axis in which it is free and the amount of its precession is proportional to roll velocity and its rate of precession is proportional to roll acceleration.

Gyroscope 9, being of the vertical-keeping type, is fixed in space and if the rolling movement of the ship conforms to simple harmonic motion (which is the natural periodic movement of a ship) then the apparent oscillation of gyroscope 9 with respect to the ship's structure is also a simple harmonic motion. Since the displacement is a sinusoidal function the velocity is also a sinusoidal function but leads in time-phase by 90°. Similarly, the acceleration is a sinusoidal function, and leads in time-phase by a further 90°. Thus, displacement and acceleration are two sinusoidal functions removed in phase by 180°, i. e., they are in anti-phase. The voltage which appears at the slider of potentiometer 10 is proportional to displacement and has a polarity depending upon the direction of displacement from the central or neutral position. The voltage of D. C. generator 12 is proportional to rotation speed and, therefore, proportional to acceleration; its polarity, which depends upon direction of rotation, depends upon whether the acceleration is in the positive or the negative sense. The voltage/speed characteristic of generator 12 and the voltage gradient along potentiometer 10 are so selected that when the movement is a simple harmonic motion the two voltages are of equal magnitude. They are connected in series opposition so that they cancel at all times when the movement is a simple harmonic motion. Under this condition no voltage appears at the input of magnetic amplifier 13.

When the ship's movement departs from simple harmonic motion the voltages of 10 and 12 no longer balance and at any instant one or other is the greater; the difference signal appears at the control winding input terminals of magnetic amplifier 13, which produces an alternating voltage output which is either in phase or antiphase with the supply voltage, depending upon the polarity of the difference voltage at its input terminals.

The case of gyroscope 11 is mechanically connected to the spindle of a transmit synchro or magslip 14 having on its rotor an energizing winding fed with A. C. and a second winding at right-angles, to which the output of amplifier 13 is connected. Thus the rotor of synchro control transmitter 14 is mechanically turned by the movement of gyroscope 11 and the axis of its magnetic field may be rotated with respect to its rotor by the voltage applied to its cross winding. Hence, the signal delivered over leads 21 corresponds to roll velocity, which is modified in a manner which depends upon the departure of the roll from the simple harmonic characteristic.

The control signal is in the form of three alternating voltages provided by synchro control transmitter 14 which are conveyed over the lines 21, through synchro control differential transmitter 5, to synchro control receiver element 15. Assuming that arm 22 of synchro differential transmitter 5 is in the position in which it does not modify the signal, it is well known in the art that arm 23 attached to the spindle of synchro control receiver element 15 will position itself according to the signal transmitted by synchro control transmitter element 14.

The movement of the arm 23 is conveyed through link 24 to one end of differential lever 20 which causes a movement of valve 25 to connect passage 26 or passage 27 to the hydraulic liquid supply from pump 18 driven by motor 19. Passages 26 and 27 connect respectively with hydraulic cylinders 28 and 29 having pistons 30 and 31, respectively, which are coupled together by coupling rod 17. One end of lever 20 is connected to rod 17 at point 32.

Assuming that arm 23 moves upwards in the figure then valve 25 is lifted to connect passage 26 with the hydraulic liquid supply so that pressure develops in cylinder 28 and acts upon piston 30. This piston moves downwards and rotates fin shaft 33 carrying fin 1 by means of lever 34 which is connected to coupling rod 17, also at point 32. Movement of piston 30 also causes a movement of differential lever 20 which moves control valve 25 downwards. When piston 30 has moved so far downwards as to re-close valve 25, the movement stops. The linkage provided by differential lever 20 will be recognized as a rigid follow-up in a servo system, which is essential to ensure that the movement of the controlled mechanism, pistons 30 and 31, is strictly proportional to the movement of the controlling mechanism, synchro receiver 15.

Fin shaft 33 is supported in bearing 35 which projects through the hull 36 of the ship.

In the operation just described, the movement of fin 1 depends entirely on the electrical signal from synchro control transmitter 14 which, in turn, depends upon residual movement of the ship. The modification of the electrical signal corresponding to fin position is carried out by means of synchro control differential transmitter 5. When fin shaft 33 is rotated by lever 32 a second lever 37 is also moved by fin shaft 33. The free end of lever 37 is connected through link 38 to arm 22 attached to the spindle of synchro control differential transmitter 5. Arm 22 is shown as having a slot 39 which enables the amount of movement of the rotor of synchro control differential transmitter 5 to be varied in relation to the movement of fin shaft 33.

Synchro 5 is, as previously mentioned, a differential type having three windings on both stator and rotor, which are connected to the incoming and outgoing lines, and this arrangement makes possible the modification of the signal passing through the synchro element 5 by another signal. In the present case it introduces a signal corresponding to the acceleration imposed by the fin upon the ship—that is to say, it increases the movement of arm 23 by an amount depending upon the angular deflection of fin 1 from the neutral position.

Figure 1A:
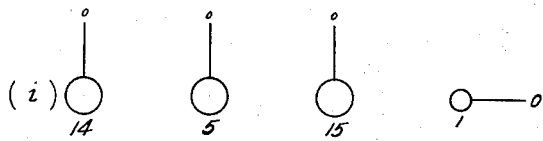
Figure 1A shows in diagrammatic form the operation of the arrangement according to Figure 1.
Figure 1A:
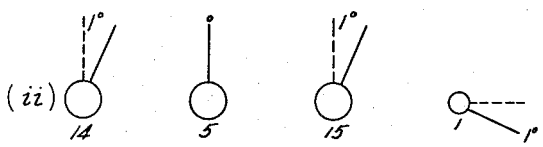
Figure 1A:
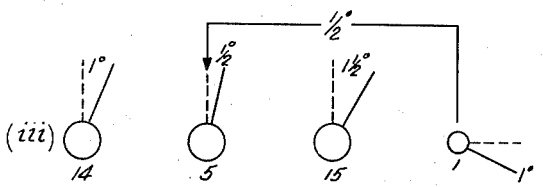
Figure 1A:
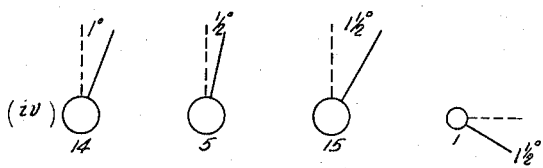
Figure 1A:
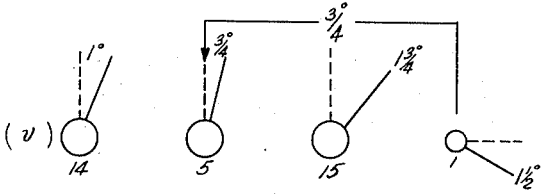
Figure 1A:
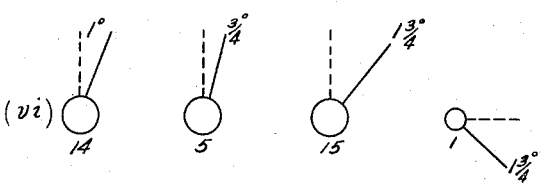
Figure 1A:
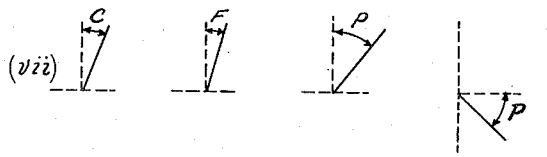

Figure 1A shows by diagrams the operation of the arrangement according to Figure 1. In these diagrams it is assumed for the sake of clarity that a given angular movement of the control element will produce an exactly equal angular movement of the fin. This is not normally true in practice but the example may be translated into practical form merely by introducing the ratio which is decided upon when designing the equipment.

In what follows a 100% compensating or feedback signal is defined as a signal which, when applied to the differential, will produce a movement in the receiver equal to that produced by the original control signal.

Referring to Figure 1A, the diagrams show, from left to right, transmitting synchro 14, differential 5, receiving synchro 15, and fin 1.

In diagram (i) all the parts are in their neutral positions and there is no deflection of the fin.

In diagram (ii) a control signal from element 14 is equivalent to a movement of 1°; this is reproduced by element 15 and results in a corresponding 1° movement of fin 1.

In this example, it is assumed that a 50% compensating signal is being employed; thus in diagram (iii) the 1° deflection of the fin causes a movement of ½° in element 5 which is added to the 1° signal from 14 so that element 15 is now deflected by 1½°.

In diagram (iv) the fin has responded to this signal and is deflected by 1½°.

In diagram (v) the signal corresponding to ¾° deflection is applied to element 5 so that element 15 is now deflected by 1¾°, being the sum of the deflection of elements 14 and 5.

In diagram (vi) the fin has responded to the signal of 15 and is deflected 1¾°. This process continues, the characteristic of the movement of the fin being similar to an exponential characteristic, until fin 1 reaches its finite position, which may be derived as follows (see diagram (vii)):

If

P is the final fin angular position,
C is the control signal,
F is the compensating signal,
$k$ is the compensating or feedback ratio (i. e. for 100% feedback $k=1$; for 50% feedback, as illustrated in Fig. 1A, $k=0.5$, etc.)

Then $P = C + F$ but $F = kP$ $\therefore P = C + kP$ $P - kP = C$ $P(1-k) = C$ $P = \dfrac{C}{1-k}$ In Figure 1A movement of the parts has been shown in steps. In the practical case, the movement of all parts is, of course, continuous. Furthermore, in discussing this movement no account has been taken of the time delay in the operation of the machinery which applies the mechanical movement to the fin. Consideration of Figures 1 and 1A will show that, whereas a control signal, in being translated from element 14 to the fin, suffers one stage of delay, the signal fed back from the fin to element 5 suffers a further stage of delay before it is translated into fin movement. The delay slows down the movement of the fin.

If the fin has reached, or almost reached, a given deflection in response to a control signal and the control signal is then reduced the fin at once begins to move in the opposite direction until it reaches a new position determined by the reduced control signal plus the predetermined proportion of compensating signal.

In this example of the operation of the invention the modifying information signal which is introduced into the sensed control signal corresponds to fin position.

The supply is connected to the energizing winding on the rotor of synchro 14 and the alternating voltage from modulator 13 is applied to the cross winding. Thus, the angular position of the field in synchro 14 produced by the energizing voltage is modified by the voltage from 13. The resultant signal transmitted by the three output leads 21 from synchro 14 corresponds to the acceleration imposed by fin 1. This combined signal is applied to a synchro receiver such as element 15 of Figure 1, the control signal being introduced by means of a differential synchro, such as element 5 of Figure 1 by connecting one set of leads with the stator windings and the other set of leads with the rotor windings of the differential element. It is well known in the art that if one quantity is to be added to or subtracted from another by means of a synchro differential system then it is immaterial whether it is applied to the transmitter or to the differential element; the result is the same.

I claim:

1. In a stabilization system for vessels of the type including movable fin means projecting laterally of the vessel, power imparting means operatively coupled to said fin means to move the same to apply a negative acceleration to the vessel to counteract undesirable positive acceleration imparted to the vessel by natural forces, movable sensing means on the ship responsive to the undesirable movement of the vessel for deriving a control signal dependent upon said movement, synchro signal information transmitting means connected to said sensing means for transmitting the sensed control signal, movable control means for said power imparting means for actuating the same so as to move the fin means, means for moving said control means including a synchro receiver means operatively connected to said movable control means so as to move the same for fin actuation and synchro signal modifying means directly interposed between said synchro signal transmitting means and said synchro receiver means and operatively coupled to said fin means so as to introduce a compensating function to change the sensed signal so that the movement of the fin means by the power imparting means responsive to actuation of the control means by the synchro receiver means is always dependent upon the movement of said sensing means and the position of said fin means.

2. In a stabilization system for vessels, gyroscope means on the vessel movable in accordance with undesirable vessel movements occasioned by natural forces, a synchro control transmitter operably connected to said gyroscope means for transmitting electrical information as a function of the positive acceleration imparted to the vessel by said forces, a synchro receiver for receiving said electrical information including a part movable in response to received information, movable fin means extending laterally of the vessel for stabilizing movements in opposite directions to impart a negative acceleration to the vessel to oppose said positive acceleration, power means connected to said fin means for moving the same, movable control means for actuating the power means, connecting means connecting said movable control means to said part of the synchro control receiver so that the control movements of the control means are effected by said synchro receiver including a rigid followup mechanism operably connected between said part of the synchro receiver, said control means and said power imparting means so that the movement of the latter is strictly proportional to the movement of the said synchro receiver part and synchro signal modifying means operably coupled to said fin means for movement in response to fin movement and electrically connected between said synchro control transmitter and said synchro receiver so that the control movement imparted to said control means by said synchro receiver part is dependent upon the transmitted signal information modified by mechanical information depending upon fin position.

3. Control apparatus for stabilization of ships comprising movable ship stabilizing means, means on the ship for deriving a control signal for said ship stabilizing means in response to undesirable movement of the ship occasioned by natural forces, actuating means including a servo-motor with a rigid follow-up control, operatively connected to said stabilizing means for actuating said stabilizing means in accordance with a received signal, means operatively coupled to said ship stabilizing means for continuously deriving a compensating signal proportional to the deflection of said stabilizing means from neutral position including means for continuously introducing said compensating signal into said derived control signal to modify the same by a quantity corresponding to at least part of the acceleration which is imposed on said ship by said stabilizing means thereby producing a modified signal and means for transmitting said modified signal to said actuating means.

4. Control apparatus for stabilization of ships comprising in combination with movable ship stabilizing means, means on the ship for deriving an electrical control signal for said ship stabilizing means in response to undesirable movement of the ship, actuating means operatively connected to said stabilizing means for actuating said stabilizing means in accordance with a received signal, additional means operatively connected to said stabilizing means for continuously deriving a mechanical positional indication from the position of the stabilizing means including a synchro-control differential transmitter means for continuously combining said positional indication with said electrical control signal to modify the same by a quantity corresponding to at least part of the acceleration imposed on said ship by said stabilizing means thereby producing a modified signal, and means for transmitting said modified signal to said actuating means.

5. In a stabilization system for seagoing vessels, stabilizing fin means extending laterally of the vessel and supported for turning movement in opposite directions from a neutral position in which the plane of the fin means extends substantially longitudinally of the vessel, movable power means for moving said fin means in opposite directions from said neutral position for vessel stabilizing purposes, movable sensing means on the vessel for deriving a control signal in response to undesirable vessel movements occasioned by natural forces, actuating means for said power means including signal receiving means movable in accordance with a received signal, movable control means operatively connected to said power means for initiating movement thereof and a rigid follow-up means connected between said signal receiving means, said control means and said power means and signal transmitting means operatively connected to said sensing means and said signal receiving means comprising movable signal modifying means including mechanical linkage means operatively coupled to said fin means for movement in response to fin movement for deriving a compensating signal proportional to the deflection of said fin means from said neutral position and for transmitting the modified signal to said signal receiving means.

References Cited in the file of this patent

UNITED STATES PATENTS

| | | |
|---|---|---|
| 471,212 | Emery | Mar. 22, 1892 |
| 2,234,326 | Tiebel | Mar. 11, 1941 |
| 2,464,629 | Young | Mar. 15, 1949 |
| 2,619,623 | Meredith | Nov. 25, 1952 |
| 2,638,288 | Hanna | May 12, 1953 |
| 2,646,947 | Kutzler et al. | July 28, 1953 |

FOREIGN PATENTS

| | | |
|---|---|---|
| 87,515 | Austria | Mar. 10, 1922 |
| 490,572 | Great Britain | Aug. 17, 1938 |
| 581,776 | Great Britain | Oct. 24, 1946 |